May 5, 1931.  F. H. HEHEMANN  1,804,162
STRAINER
Filed May 1, 1930   2 Sheets-Sheet 1

INVENTOR
Frederick H. Hehemann.
BY
Toulmin & Toulmin
ATTORNEY

May 5, 1931.  F. H. HEHEMANN  1,804,162
STRAINER
Filed May 1, 1930  2 Sheets-Sheet 2

INVENTOR
Frederick H. Hehemann
BY Toulmin & Toulmin
ATTORNEY

Patented May 5, 1931

1,804,162

UNITED STATES PATENT OFFICE

FREDERICK H. HEHEMANN, OF CINCINNATI, OHIO, ASSIGNOR TO THE LUNKENHEIMER COMPANY, OF CINCINNATI, OHIO, A CORPORATION OF OHIO

STRAINER

Application filed May 1, 1930. Serial No. 448,879.

This invention relates to improvements in strainers, and especially strainers of this type for use in connection with airplane motors. While this strainer is particularly well adapted for use with airplane motors, it is well adapted for use with other motors.

It is an object of this invention to provide a strainer consisting of a casing through which the gasoline passes, and in which there is placed a removable strainer for the purpose of straining the gasoline.

It is also an object of this invention to provide a removable sieve mounted upon a casing closure in such a way that there is a loose connection between the strainer and the casing closure, and the two may be mounted by one hand of the operator. For this purpose there is provided in the casing a seat for a closure adapted to be engaged by a latch member swivelly attached to the closure and operated by a screw. This screw serves both to position the strainer member within the casing, to rotate the latch member in latching position and to force the closure into closing position so that the strainer is held within the casing for the purpose of straining the gasoline passing through the casing.

It is also an object of this invention to provide means for securely locking the screw against rotation so that there is no danger of the parts becoming detached.

These and other advantages will appear from the following description, taken in connection with the drawings.

Referring to the drawings.

Figure 1:
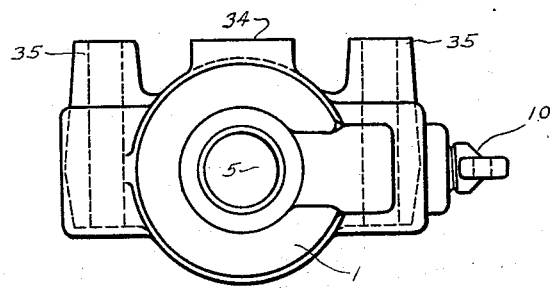
Figure 1 is a view of the outlet end of the strainer casing.
Figure 2:
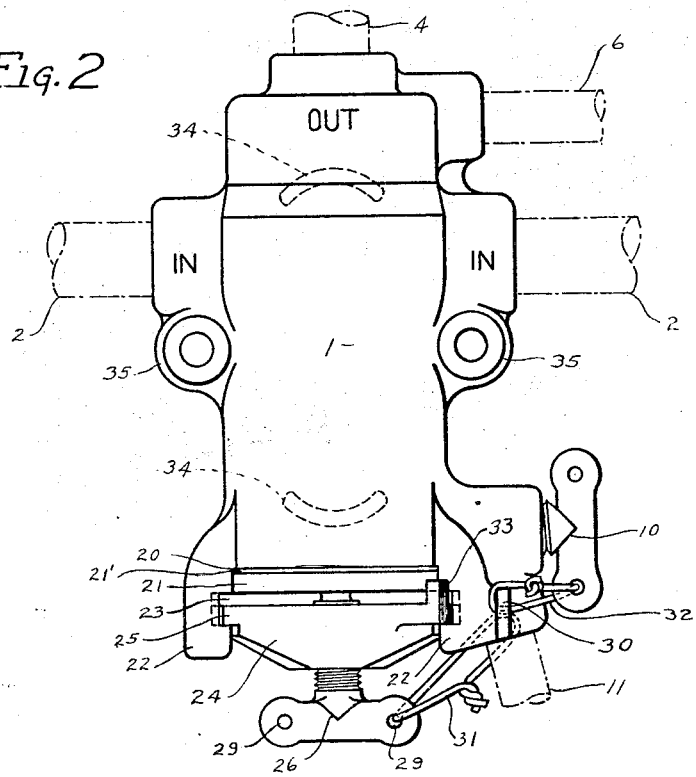
Figure 2 is a front view of the casing.
Figure 3:
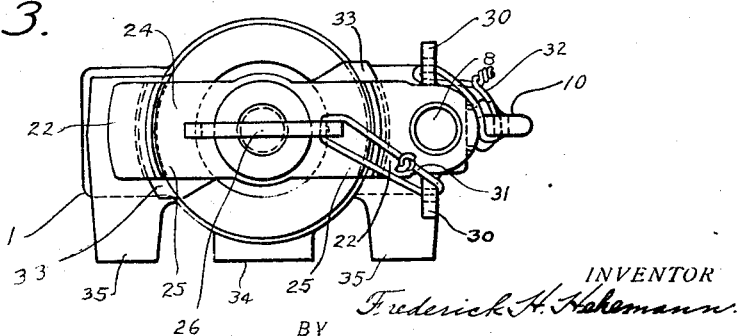
Figure 3 is an end view of the casing showing the means for supporting and locking the strainer within the casing.
Figure 5:
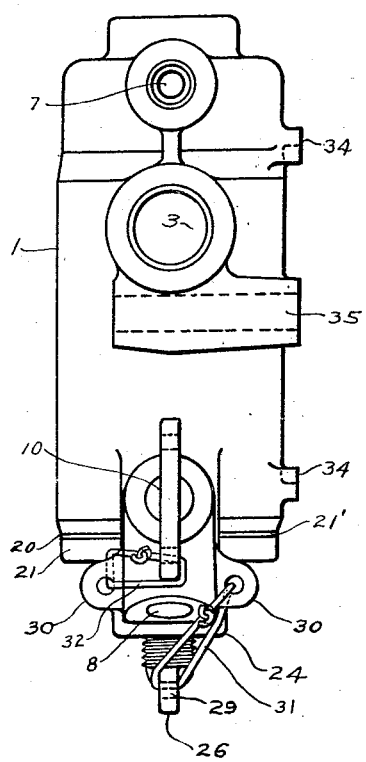
Figure 5 is a view similar to Figure 2 but taken from the righthand side thereof.
Figure 6:
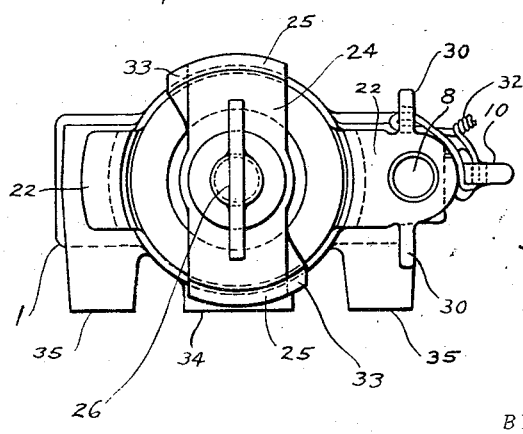
Figure 6 is a view similar to Figure 3 but showing the latch out of latched position so that the strainer may be removed from the casing.
Figure 7:
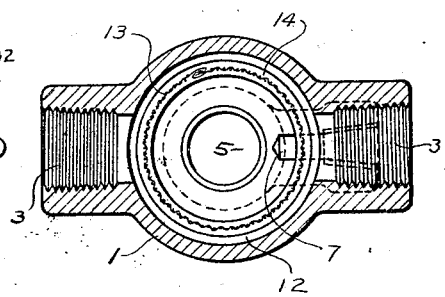
Figure 7 is a section on the line 7—7 of Figure 4.

In Figures 2 and 5 there is shown a completed strainer casing with the parts locked in operating position. In these figures the casing which contains a strainer and the closure and provides a housing therefor is indicated by the numeral 1. This casing provides a cylindrical chamber which has on each side inlet pipes 2 connected to inlet ports 3. These inlet ports lead into the central part of the chamber.

Leading from one end of the casing and connected to the chamber is an outlet pipe 4 connected to an outlet 5. There is also extending from one end near the outlet a primer connection or pipe 6, which is connected into a primer socket 7. At the other end, away from the exit, there is a drain opening 8. In this opening for the purpose of controlling it there is a valve 9. This valve is operated by a wing screw 10. Connected to the drain opening is a drain pipe 11.

Figure 4:
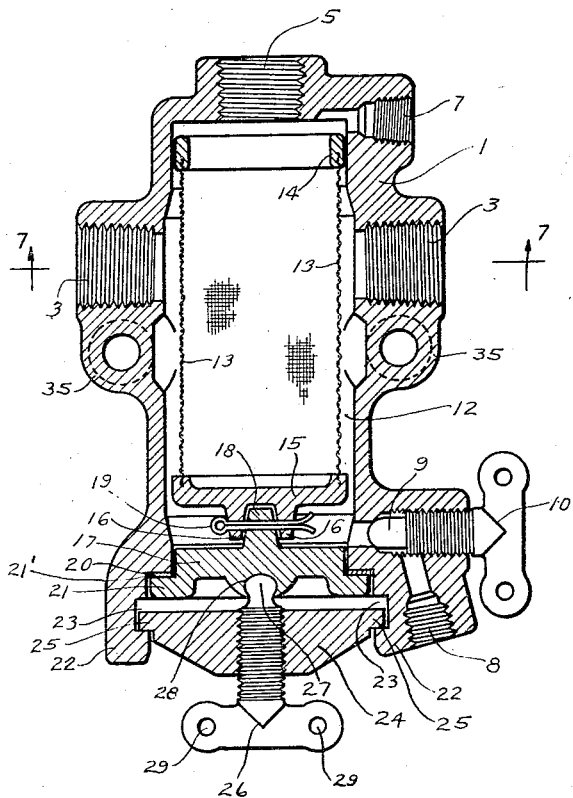
Figure 4 is a longitudinal section through the casing and the strainer, showing the means for attaching the strainer to the casing.

The cylindrical chamber within the casing is indicated by the numeral 12 and is somewhat restricted near the outlet end, as indicated in Figure 4. The strainer is cylindrical in shape and fits within the chamber. The walls of this strainer are indicated by the numeral 13. The inner end of the strainer is ring shaped and is indicated by the numeral 14. This ring is formed by placing one part of a ring within the end of the strainer and turning the outside end of the ring over to engage the side of the strainer wall opposite that engaged by the inside part of the ring. By this means there is formed a strengthening ring on the inner end of the strainer that entirely and firmly grips the end of the strainer.

This strainer is made from a rectangular piece of wire gauze, the opposite ends of which are looped and brought into engagement with each other and pressed to form a close fitting seam or connection in this part of the strainer wall. On the other end of the strainer is a disc 15. This disc originally has extending within this end of the strainer an annular shoulder with a flange extending therefrom. The flange is spun over against the outside faces of the walls of the strainer so that the shoulder and the spun-over flange securely hold this end of the strainer. It will be observed from this description of the strainer that the strainer is cylindrical in shape, open at one end and closed at the other, and is inserted within the cylindrical part of the casing where the spun strengthening ring part engages the somewhat restricted part of the chamber near the exit or outlet pipe.

Extending from the disc 15 are two lugs 16, forming a socket. The end of the casing opposite the outlet provides an opening and a closure seat. For the purpose of closing this opening there is a closure 17 which has extending therefrom a lug 18 to fit in the socket between the lugs 16. These lugs 16 and 18 have extending therethrough holes in which there is a cotter pin 19 for the purpoes of holding the strainer to the closure member. This cotter pin affords a loose connection between the strainer and the closure so that there is a slight movement in all directions.

The seat for the closure member 17 is indicated by the numeral 20. The closure member 17 partly fits within the open end of the casing and has a flange 21 resting upon the closure seat. Between the closure seat and the flange of the closure is a gasket 21'. The purpose of this gasket is to form a sealing engagement between the closure and the walls of the casing so that no gasoline may escape from the chamber of the casing out around the closure.

On opposite sides of the casing adjacent the closure member are ears 22. Each of these ears has a slot 23 therein. These slots are for the purpose of receiving the ends of a latch member 24. These ends are formed to fit easily within the slots and so that they may also be easily removed therefrom. These ends are indicated by the numeral 25. Extending through the latch member 24 is a wing bolt 26. On the inner end of this bolt is a ball 27 which fits within a socket 28 on the closure member 17. In each wing of the bolt 26 are holes 29.

On each side of one of the ears, in which there is provided the drainline, there is an ear or wing 30. Extending between one of the wings 30 and the wing of the wing bolt is a wire 31 for the purpose of holding the wing bolt against turning when it has been properly adjusted for the purpose of locking the closure in its seat and the latch member in the slots 23. There is also extending from another one of these wings 30 a second wire 32 for the purpose of holding the drain valve closed so there is no leakage through this valve during the time the strainer is being used.

There is also provided on each end of the latch member a stop 33 which engages one of the ears 22. For the purpose of providing a support and forming a bed for the casing there are pads 34, one at each end or near each end of the casing. There is also provided on each side of the casing an eye 35 with a hole therethrough by which the casing may be attached to a support. The ends of these eyes adjacent the pads are in a plane with the surfaces of the pads so that all of them will contact with the plane surface at the same time.

The material of which this strainer casing is made may be any suitable material. It is preferably made of some light metal, such as aluminum, or some light alloy. The whole is constructed and assembled in such a way that by taking hold of the wing bolt 26 with one hand the bolt may be rotated, first to release the latch 24 from engagement with the ears 22, then to rotate the latch member out of the slots 23. When this is done the closure and the strainer thereon may be removed by withdrawing the parts longitudinally from the casing and the chamber. When this is done any repairs or replacements may be made and the parts inserted in the position shown in Figure 4. The pivotal connection between the strainer and the closure member permits of an accurate and ready seating of the end 14 of the strainer within the reduced part of the chamber. When the parts are properly located by rotating the bolt 26 clockwise the latch member 24 is brought into engagement with the ears, after which a further rotation of the bolt forces the closure member into seated engagement with the seat end of the casing so that a gasoline-tight fit is formed between the casing and the closure.

It is therefore obvious that this strainer can be removed and placed back by one hand of the operator. The placing and the removal are done by reverse actions. If the latch member should be so far out on the bolt that it will not engage or fit within the socket a proper rotation of the bolt will adjust the latch so that it will then engage the sockets and be locked thereto by a proper movement of the bolt.

I desire to comprehend within my invention such modifications as may be clearly embraced within my claims and the scope of my invention.

Having thus fully described my invention, what I claim is new and desire to secure by Letters Patent, is:

1. In an apparatus, a strainer therefor consisting of a cylindrical gauze member supported at one end by a disc in which one end of said gauze member is embedded and strengthened at its other end by a ring fitting within said gauze member and spun over to engage the end and the outside of said gauze member and a carrier for the strainer pivoted to said disc.

2. In a strainer apparatus, a strainer therefor consisting of a cylindrical gauze member formed from a strip of wire gauze having opposite edges looped and pressed together, supported at one end by a disc in which the gauze member is embedded and strengthened at the other end by a ring fitting within said gauze member and spun over to engage the end and the outside of said gauze member and a carrier for said strainer pivoted to said disc.

3. In a strainer apparatus, a strainer therefor consisting of a gauze member formed of a strip of wire gauze with opposite edges looped and pressed together, a disc support member having a shoulder fitting within one end of said gauze member and a flange periphery spun over to engage the outside of the end of said gauze member and clamp it against the part of the disc member fitting within said gauze member, and a strengthening ring on the other end of said gauze member, said ring fitting within said end of said gauze member and spun over to engage the outside thereof.

4. In a strainer, a casing having an inlet on one side, an outlet and an opening forming a closure seat, a cylindrical strainer member, a closure member loosely attached to one end of said strainer member and adapted to rest on said closure seat with the strainer member in said chamber between the inlet and the outlet, and means for locking said closure member on said closure seat, including a pair of ears on said casing and a latch member having a swivel connection with said closure member to engage said ears.

In testimony whereof, I affix my signature.

FREDERICK H. HEHEMANN.